United States Patent [19]

Sigmon

[11] 3,788,653
[45] Jan. 29, 1974

[54] ROTARY FLUID SEAL
[75] Inventor: James W. Sigmon, Charlotte, N.C.
[73] Assignee: Sigmon Corporation, Charlotte, N.C.
[22] Filed: Sept. 18, 1972
[21] Appl. No.: 289,798

[52] U.S. Cl............................ 277/70, 277/DIG. 8
[51] Int. Cl......................... F16j 15/38, F16j 15/40
[58] Field of Search...... 277/DIG. 8, 70, 71, 74, 79, 277/81

[56] References Cited
UNITED STATES PATENTS

| | | | |
|---|---|---|---|
| 849,115 | 4/1907 | France | 277/70 |
| 2,247,505 | 1/1939 | Kohler | 277/81 |
| 2,746,777 | 5/1956 | Korn | 277/70 |
| 3,021,146 | 2/1962 | Sommer et al. | 277/DIG. 8 |
| 3,493,235 | 2/1970 | Pautz et al. | 277/70 |

Primary Examiner—William T. Dixson, Jr.
Assistant Examiner—Robert I. Smith
Attorney, Agent, or Firm—Daniel E. McConnell

[57] ABSTRACT

A rotary fluid seal comprising a housing having a fluid pressure chamber therein, with a shaft mounted for rotation in the housing and having a longitudinal passageway therein for communicating with the fluid pressure chamber within the housing. The housing is provided with port means extending therethrough communicating with the fluid pressure chamber for introducing a fluid therein. Sealing means are positioned within the housing and cooperate with the fluid pressure chamber therein for controlling the flow of fluid from within the fluid pressure chamber into the longitudinal passageway of the shaft without escapement from around the shaft. The sealing means comprises a rotatable member of rigid construction, concentrically carried by, and rotatable with the shaft and having an axial face serving to define a wall portion of the fluid pressure chamber, and a seal member carried by the housing and having a flexible annular lip portion sealingly engaging the axial face of the rotatable member concentrically therewith, and also serving to define a wall portion of the fluid pressure chamber.

11 Claims, 6 Drawing Figures

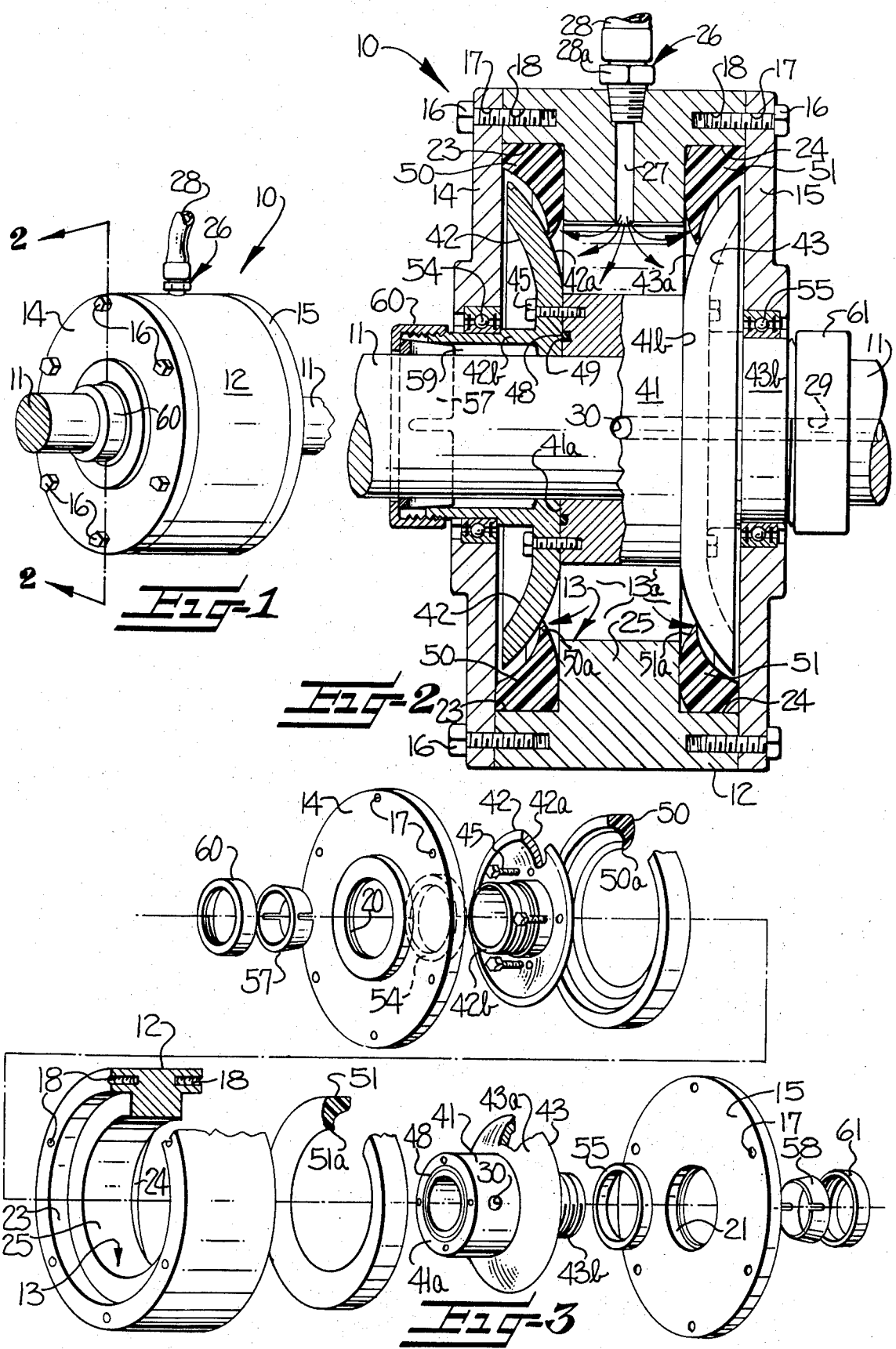

ROTARY FLUID SEAL

This invention relates to a rotary fluid seal adapted particularly for introducing a pressurized fluid, such as compressed air, into a rotatable shaft while preventing leakage of the fluid thus being introduced. Heretofore various types of rotary fluid joints have been devised to accomplish essentially the same purpose. However, in an effort to provide a leakproof seal when transmitting fluids under pressure, it has usually been necessary to utilize seals having engaged surfaces held in engaging position by a spring or the like, with the seals having a relatively large surface area of contact. This normally results in the generation of a substantial amount of friction between sealing members, which, because the friction is distributed over a relatively large surface area, is relatively inefficient, but nevertheless has a tendency to increase the energy needed to maintain the desired speed of shaft rotation, and to require frequent replacement or repair of the sealing members.

It is therefore an object of this invention to provide a rotary fluid seal which utilizes the pressure of the fluid passing therethrough to engage sealing means for thus preventing leakage.

It is another object of this invention to provide a sealing means of the aforementioned type, which compensates for gradual wear to lengthen the frequency of replacement and to provide a continuously leakproof seal.

Some of the objects of the invention having been stated, other objects will be evident as the description proceeds, when taken in connection with the accompanying drawings, in which FIG. 1 is a perspective view of a rotary fluid seal according to a preferred embodiment of the invention;

FIG. 2 is a vertical cross section taken substantially along line 2—2 of FIG. 1;

FIG. 3 is an exploded, perspective view thereof;

Figure 4:
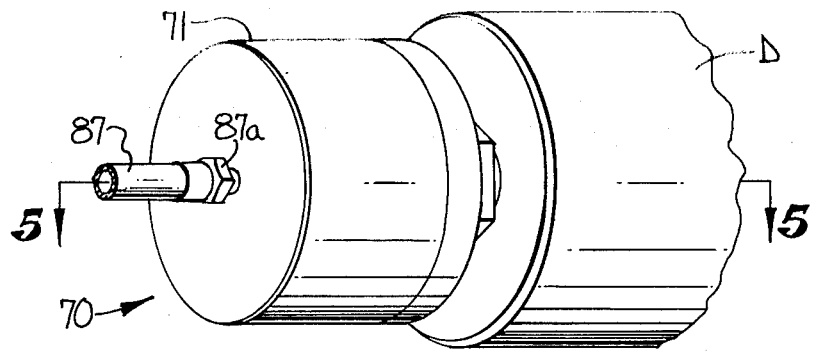
FIG. 4 is a perspective view of a rotary fluid seal according to another embodiment of the invention, shown connected to a rotating drum, with a portion of the rotating drum broken away.

Referring now more specifically to the drawings, a rotary fluid seal according to a preferred embodiment thereof is shown in FIG. 1 and comprises a housing, broadly indicated by reference numeral 10, and having a shaft 11 mounted therein for rotational movement. While the structure is herein referred to by the term "rotary fluid seal," the term "joint" is used alternatively. The housing, according to FIGS. 2 and 3, comprises an intermediate cylindrical housing member 12 having an axially extending bore 13 therethrough, central portions of which define a fluid pressure chamber 13a, as will be described in detail hereinafter. Enclosing the opposing ends of the housing member 12 are cylindrical end caps 14, 15, which are releasably secured in any suitable way to the opposing axial ends of the housing member 12, as for instance, by threaded bolts 16 extending through holes 17 around the periphery of the axial face of the end caps 14, 15, and positioned in threaded bores 18 in the respective axial faces of the housing member 12. The end caps 14, 15 have aligned, substantially concentric holes 20, 21, respectively, extending axially therethrough for accommodating the rotatably mounted shaft 11.

Formed on the inner surface of the housing member 12 are axially opposed annular recessed portions 23, 24, as is best shown in FIG. 3. A raised portion of the inner surface of housing member 12 intermediate the respective opposed recesses 23, 24, defines an annular, integrally formed rib 25, the purpose of which will be described in detail hereinafter.

A fluid is introduced into the fluid pressure chamber 13a by port means, broadly indicated by reference numeral 26 and comprising radial bore 27 extending through the body and rib 25 of housing member 12 and communicating with the fluid pressure chamber 13a, with a hose 28 having a threaded coupling 28a, connected to the housing member 12 in communication iwth the bore 27.

A cylindrical hub 41 the purpose of which will be set forth hereinafter, is suitably positioned, as by a press fit, on the shaft 11 for rotation therewith, and in substantial radial alignment with the integrally formed annular rib 25 of housing member 12.

Extending longitudinally through the rotatably mounted shaft 11 is a passageway 29, which communicates with the fluid pressure chamber 13a through at least one laterally or radially extending passageway 30 in the shaft 11 and hub 41.

Positioned in spaced relation to each other on the shaft 11 within the housing 10 and serving to prevent the escape of fluid therefrom are sealing means, broadly indicated by reference numeral 40 and comprising an opposed pair of rotatable members 42, 43, in the form of annular disks, and a pair of annular seal members 50, 51. The annular disks 42, 43 are positioned concentrically on the shaft 11 and connected, as by threaded bolts 45, to opposing axial faces 41a, 41b of the hub 41, and are preferably formed of a non-corrosive metal such as stainless steel. To prevent leakage of fluid from the fluid pressure chamber 13a to the shaft 11 at the area of connection of the hub 41 and the annular disks 42, 43, box ring seals 48 are provided, positioned in annular recesses 49 in the opposing axial faces 41a, 41b, of the hub 41, and concentric therewith.

Disks 42, 43 have convex, inwardly opposed axial faces 42a, 43a, respectively, and outwardly opposed, concentric annular neck portions 42b, 43b, respectively. The neck portions 42b, 43b extend outwardly from the housing member 12 through holes 20, 21 of end caps 14, 15, respectively. The axial faces 42a, 43a of annular disks 42, 43, respectively, as shown in FIG. 2, are positioned on the shaft 11 in substantial radial alignment with recessed portions 23, 24, respectively, of housing member 12.

Forming a seal with the convex axial faces 42a, 43a, of the annular disks 42, 43, respectively, are the annular seal members 50, 51, supportingly carried in the annular recessed portions 23, 24, respectively, of housing member 12 of housing 10. The annular seal members 50, 51, are shown in the form of a ring made of a suitable resilient or elastomeric material, such as molded tetrafluoroethylene (TFE) fluorocarbon resin. Integrally formed on the annular rings 50, 51, are somewhat curved, radially inwardly extending, flexible tapered lip portions 50a, 51a, respectively, having a very thin free end. When positioned in respective recessed portions 23, 24, as shown in FIG. 2, the very thin, free end of the tapered lip portions 50a, 51a, is positioned in substantially hairline engagement with the respective convex axial faces 42a, 43a, of the annular disks 42, 43.

From the foregoing description, and as best illustrated in FIG. 2, it will be apparent that the walls of fluid pressure chamber 13a are defined by the opposing radial surfaces of the annular rib 25 of housing member 12 and hub 41, in conjunction with portions of the convex axial faces 42a, 43a, of annular disks 42, 43 and the lip portions 50a, 51a, of annular rings 50, 51.

Shaft 11, with sealing means 40 positioned thereon, can be mounted for rotation in the housing 10 by any suitable means. One such suitable means is illustrated in FIG. 2, and comprises a pair of anti-friction members, shown as annular ball bearing assemblies 54, 55, positioned around shaft 11 in an annular recess provided on the inner axial face of cylindrical end caps 14, 15, respectively. When positioned in these recesses, the inner radial surfaces of the ball bearing assemblies 54, 55 ride in engagement with reduced outer end portions of the outwardly extending neck portions 42b, 43b of the annular disks 42, 43.

Serving to prevent axial dislocation of the sealing means 40 within the housing 10, or more specifically, to maintain the proper relative location of annular disks 42, 43, with the annular rings 50, 51, respectively, are annular collets 57, 58, each having a gradual external axial taper. The end of collets 57, 58 having the smaller external diameter is positioned on the shaft 11 outside the housing 10 and adjacent cylindrical end caps 14, 15, respectively. Then they are wedged axially inwardly a distance determined by the taper of collets 57, 58, into a clearance 59 between the outer end of neck portions 42b, 43b of annular disks 42, 43, respectively, and the radial surface of shaft 11.

The collets 57, 58 are held in their wedged position by a pair of annular compression nuts 60, 61, having internally threaded portions which engage matingly threaded portions located on the outer end of neck portions 42b, 43b, respectively.

In operation, as is evident from the foregoing description, a fluid is introduced into said pressurized fluid chamber 13a through the radial bore 27. The fluid then enters the longitudinally extending passageway 29 in shaft 11 through the laterally extending passageway 30. The pressure in fluid pressure chamber 13a caused by the presence of the pressurized fluid therein acts on lip portions 50a, 51a, as is shown by arrows in FIG. 2, so that they are maintained in sealing engagement with the convex axial faces 42a, 43a of annular disks 42, 43, respectively. It will be understood that the lip portions 50a, 51a are in engagement with the convex axial faces 42a, 43a at all times, but that the pressure exerted on the flexible annular lip portions 50a, 51a increases the friction therebetween, and creates a tighter seal.

As is evident, the higher the pressure within the fluid pressure chamber 13a, the tighter the seal that will be provided thereby, provided the pressure is within the normal operating limits of the rotary fluid joint as a unit. It will also be understood that in normal operation, shaft 11 is intended to rotate, but that the rotary fluid joint will operate continuously to provide a proper seal even though the shaft 11 is rotated intermittently, or not at all. Furthermore, it is apparent that the flexible annular lip portions 50a, 51a, will gradually wear away, and as this occurs, the pressure in fluid pressure chamber 13a will continue to maintain the lip portions 50a, 51a in sealing engagement with the convex axial faces 42a, 43a by urging the lip portions 50a, 51a, gradually outward along the curved surface of the convex axial faces 42a, 43a.

From the foregoing description, it is seen that hub 41 and the annular disks 42, 43, together with collets 57, 58 and compression nuts 60, 61 are all carried on and rotate with shaft 11, while annular rings 50, 51 remain relatively stationary, being supported, as described hereinbefore, by the walls of housing 12 defining recesses 23, 24, respectively.

Figure 5:
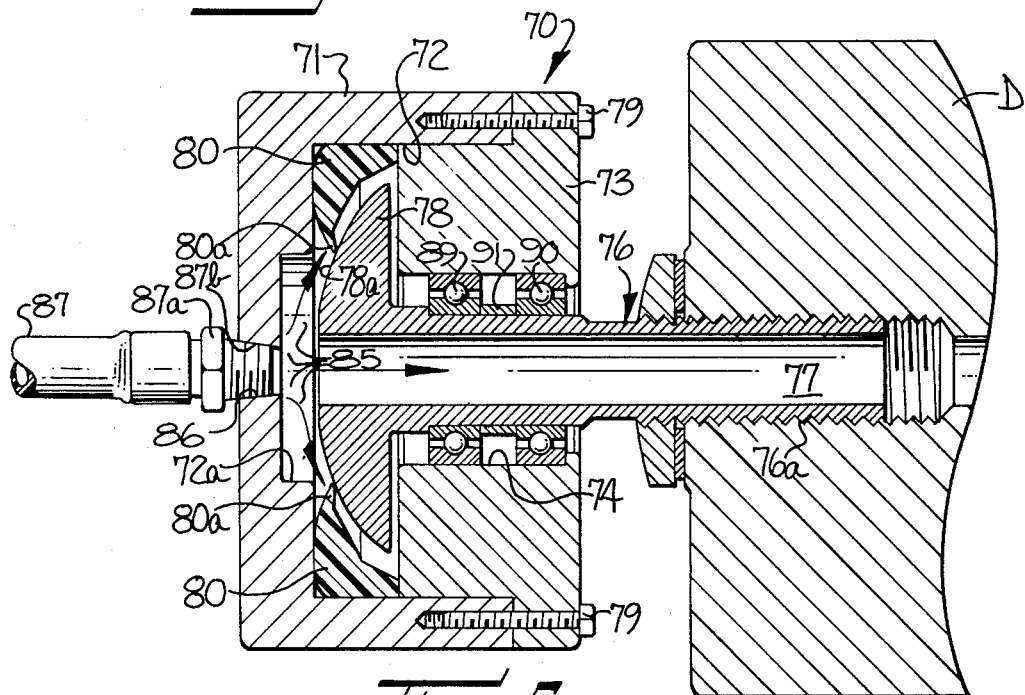
FIG. 5 is a vertical cross-sectional view taken substantially along line 5—5 of FIG. 4.
Figure 6:
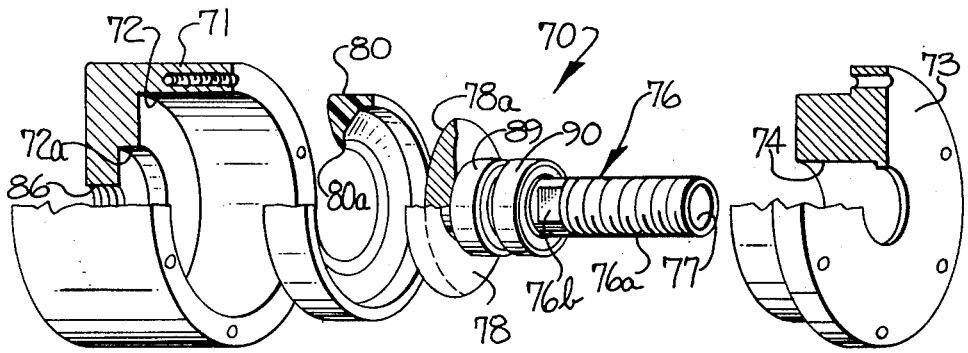
FIG. 6 is a partially exploded perspective view of the rotary fluid seal of FIG. 4.

A rotary fluid seal according to a modified form of the invention, and intended particularly for introducing a pressurized fluid, such as compressed air, into the axial end of a rotating shaft connected to a drum D, for example, is shown in FIGS. 4 through 6. The rotary fluid seal comprises a housing, broadly indicated by reference numeral 70, and as is best shown in FIGS. 5 and 6, housing 70 comprises a first cylindrical housing member 71, having an axially extending predetermined large diameter bore 72 therein communicatively connected with an axially extending concentric smaller bore 72a. Interconnected with the first housing member 71 is a second cylindrical housing member 73, having an outside diameter corresponding to the outside diameter of the first housing member 71, and having a relatively small diameter concentric bore 74 therein. When housing member 71, 73 are suitably interconnected, as by a plurality of threaded bolts 79 in matingly threaded, aligned bores positioned around the outer adjoining axial peripheries of the first and second housing members, the interior walls of the housing members 71, 73, define axially extending concentric bores—the small diameter bore 74 in housing 73 communicating with the large diameter bore 72 in the first housing member 71 which in turn communicates with bore 72a which serves to define a portion of a fluid pressure chamber.

Positioned within the large bore 72 and small bore 74 is a longitudinally extending shaft, broadly indicated by reference numeral 76, and having a longitudinally extending passageway 77 therein communicating with the bore 72a through the axial face of the portion of shaft 76 positioned in large bore 72. It will be noted that the diameter of shaft 76 positioned in small bore 74 is substantially smaller than the diameter of the small bore 74 so as to accommodate antifriction means as will be described in detail hereinafter.

A threaded portion 76a of the shaft 76 extends outwardly from the small diameter bore 74 in the second housing member 73 for interconnecting with a rotating structure, such as the drum D in FIGS. 4 and 5. A plurality of flat portions 76b are provided on the radial surface of the shaft 76 to provide a gripping surface for a wrench or the like, to facilitate easy loosening and tightening of shaft 76 in the Drum D.

Carried on the end of shaft 76 within the large diameter bore 72 is an annular disk 78, preferably integrally formed therewith, and preferably formed of a long-wearing, non-corrosive material such as stainless steel, and having a convex axial face 78a communicating with the fluid pressure chamber bore 72a. Also positioned in large diameter bore 72 and supported by the inner walls of the first and second cylindrical housing members 71, 73 is a resilient annular ring 80, similar to rings 50 and 51 previously described, having a radially extending, tapered flexible annular lip portion 80a. Lip portion 80a curves into engagement with axial face 78a of annular disk 78 to form a relatively thin, hairline seal therewith. As is best shown in FIG. 5, a fluid pressure chamber 85 is formed substantially by the fluid pressure chamber bore 72a, with the free end of lip portion 80a, central portions of axial face 78a, and adjacent wall portions of large diameter bore 72, together forming an axial wall of the fluid pressure chamber 85.

Serving to introduce a fluid into fluid pressure chamber 85 are suitable port means, comprising an axial bore 86 extending concentrically through the axial face of first housing member 71, and communicating with fluid pressure chamber 85 therein. A hose 87, having a threaded coupling 87a, is connected to the first housing member 71 by means of a matingly threaded portion 87b on the inner walls thereof defining bore 86.

Shaft 76 is mounted for rotational movement within the second housing member 73 by means of a pair of antifriction means comprising spaced apart annular ball bearing assemblies 89, 90, positioned snugly around shaft 76 in a reduced radial portion thereof. The inner walls of small diameter bore 74 engage the outer radial surfaces of annular ball bearing assemblies 89, 90 with the annular ball bearing assemblies 89, 90 being maintained in axial, spaced apart relation by an annular spacing ring 91 positioned therebetween.

In operation, as is evident by the foregoing description, a pressurized fluid is introduced into fluid pressure chamber 85 through hose 87. As illustrated in FIG. 5, bore 86 is substantially concentric with and in close opposition to passageway 77 in shaft 76 so that a substantial amount of the fluid is passed almost directly thereinto. However, pressurized fluid fills fluid pressure chamber 85 and, as shown by arrows in FIG. 5, forces the lip portion 80a of annular ring 80 into the proper sealing engagement with axial face 78a of annular disk 78. It will be understood, as earlier noted in the first embodiment of the invention, that lip portion 80a is intended to always be in engagement with axial face 78a, the fluid pressure increasing the frictional forces between the two members for effecting a tighter seal. It will be further understood, as also mentioned earlier, that as annular disk 78 rotates with shaft 76, the engaged surface of lip portion 80a will gradually wear away, so that as lip portion 80a becomes shorter, the pressure in fluid pressure chamber 75 will tend to urge it outwardly along axial face 78a, thus compensating for wear.

It will be apparent that this embodiment is, as is the first embodiment, constructed so that the greater the pressure of the fluid flow therethrough, the better the seal obtained, due to the increased forces urging the lip portion 80a into sealing engagement with the axial face 78a of annular disk 78.

It will thus be seen that there is described herein two embodiments of a rotating fluid seal, each having relatively few parts, but providing a substantially leakproof seal, the quality of which is relatively unaffected by a predetermined degree of wear of the lip portions of the annular rings provided in each embodiment.

It will be understood that various details of the invention may be changed without departing from the scope of the invention. Furthermore, the foregoing description is for purposes of illustration only and not for purposes of limitation — the invention being defined by the claims.

That which is claimed is:

1. A rotary fluid seal comprising a housing having a fluid pressure chamber therein, a shafted mounted for rotation in said housing and having a longitudinal passageway therein communicating with said fluid pressure chamber within the housing, said housing having port means extending therethrough communicating with said fluid pressure chamber for introducing a fluid therein, and sealing means positioned within said housing and cooperating with said fluid pressure chamber therein for controlling the flow of fluid from within the fluid pressure chamber into the passageway of said shaft without escapement from around the shaft, said sealing means comprising a rotatable member of rigid construction, concentrically carried by, and rotatable with said shaft and having an axial face serving to define a wall portion of said fluid pressure chamber, and a seal member carried by said housing and having a flexible annular lip portion sealingly engaging said axial face of said rotatable member concentrically therewith and also serving to define a wall portion of said fluid pressure chamber.

2. A rotary fluid seal according to claim 1, wherein said rotatable member on said shaft comprises an annular disk with said axial face thereof being of convex configuration for compensating for wear of said flexible annular lip portion of said seal member and for effecting a seal under variable pressure conditions.

3. A rotary fluid seal according to claim 1, wherein said flexible annular lip portion of said seal member extends substantially radially inwardly into engagement with said axial face and wherein said lip is tapered to provide a very thin free end for effecting substantially hairline engagement with said axial face.

4. A rotary fluid seal according to claim 1, wherein said seal member comprises an elastomeric annular ring.

5. A rotary fluid seal comprising a housing having a fluid pressure chamber therein, a shaft mounted for rotation in said housing and having a longitudinal passageway therein communicating with said fluid pressure chamber within the housing, said housing having port means extending therethrough communicating with said fluid pressure chamber for introducing a fluid therein, and sealing means positioned within said housing and cooperating with said fluid pressure chamber therein for controlling the flow of a fluid from within the fluid pressure chamber into the passageway of said shaft without escapement from around the shaft, said sealing means comprising a rotatable annular disk of rigid construction, concentrically carried by said shaft and having an axial face serving to define a wall portion of said fluid pressure chamber, and an annular ring, carried by said housing and having a flexible annular lip portion concentrically engaging said axial face of said rotatable annular disk and also serving to define a wall portion of said fluid pressure chamber.

6. A rotary fluid seal comprising a housing having a fluid pressure chamber therein, a shaft mounted for rotation in said housing and having a longitudinal passageway therein communicating with said fluid pressure chamber within the housing, said housing having port means extending therethrough communicating with said fluid pressure chamber for introducing a fluid therein, and sealing means positioned in said housing and cooperating with said fluid pressure chamber therein for controlling the flow of fluid from within the fluid pressure chamber into the passageway of said shaft without escapement from around the shaft, said sealing means comprising a spaced pair of opposed, rotatable members of rigid construction, concentrically carried by, and rotatable with said shaft, each of said rotatable members having an axial face serving to define a wall portion of said fluid chamber, and a pair of spaced seal members carried by said housing with each having a flexible annular lip portion concentrically engaging the respective axial face of said pair of rotatable members and also serving to define a wall portion of said fluid pressure chamber.

7. A rotary fluid seal according to claim 6, including a hub member mounted on said shaft between said pair of opposed rotatable members and rotatable therewith, and said shaft and said hub member having a communicating laterally extending passageway therethrough communicating with said longitudinally extending passageway in the shaft and with said fluid pressure chamber.

8. A rotary fluid seal according to claim 7, wherein seals are positioned between opposing ends of said hub member and said rotatable members for preventing leakage of fluid therebetween.

9. A rotary fluid seal comprising a housing having a fluid pressure chamber therein, a shaft mounted for rotation in said housing with an end portion thereof terminating within the housing, said shaft having a longitudinal passageway therethrough communicating with said fluid pressure chamber, said housing having port means extending therethrough communicating with said fluid pressure chamber for introducing a fluid therein, and sealing means positioned within said housing and cooperating with said fluid pressure chamber therein for controlling the flow of fluid from within the pressure chamber into the passageway of said shaft without escapement from around the shaft, said sealing means comprising a rotatable member of rigid construction, concentrically carried adjacent said end portion of, and rotatable with, said shaft and having an axial face serving to define a wall portion of said fluid pressure chamber, and a seal member carried by said housing and having a flexible annular lip portion sealingly engaging said axial face of said rotatable member concentrically therewith, and also serving to define a wall portion of said fluid pressure chamber.

10. A rotary fluid seal according to claim 9, wherein said rotatable member is integrally formed on said shaft.

11. A rotary fluid seal according to claim 9, wherein said port means communicating with said fluid pressure chamber comprises a bore extending through said housing in opposition to and closely adjacent said longitudinal passageway in said shaft for passing a pressurized fluid from said bore into the longitudinal passageway of said shaft.

* * * * *

UNITED STATES PATENT OFFICE
CERTIFICATE OF CORRECTION

Patent No. 3,788,653            Dated January 29, 1974

Inventor(s) James W. Sigmon

It is certified that error appears in the above-identified patent and that said Letters Patent are hereby corrected as shown below:

Column 2, line 17, correct the spelling of "with"

Column 3, line 2, following "hairline" insert --sealing--

Column 6, line 2, delete "shafted" and insert therefor --shaft--

Signed and sealed this 1st day of October 1974.

(SEAL)
Attest:

McCOY M. GIBSON JR.
Attesting Officer

C. MARSHALL DANN
Commissioner of Patents